United States Patent
Ogino et al.

(10) Patent No.: US 11,194,279 B2
(45) Date of Patent: Dec. 7, 2021

(54) POWER SUPPLY AND IMAGE FORMING APPARATUS INCORPORATING SAME

(71) Applicants: Tatsuya Ogino, Saitama (JP); Shuntaro Nakayama, Kanagawa (JP); Takuya Tanimura, Kanagawa (JP); Kentaroh Kajita, Kanagawa (JP)

(72) Inventors: Tatsuya Ogino, Saitama (JP); Shuntaro Nakayama, Kanagawa (JP); Takuya Tanimura, Kanagawa (JP); Kentaroh Kajita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/868,840

(22) Filed: May 7, 2020

(65) Prior Publication Data
US 2020/0363762 A1 Nov. 19, 2020

(30) Foreign Application Priority Data

May 15, 2019 (JP) .............................. JP2019-092197
Apr. 8, 2020 (JP) .............................. JP2020-069998

(51) Int. Cl.
*H02M 1/32* (2007.01)
*G03G 15/00* (2006.01)

(52) U.S. Cl.
CPC ......... *G03G 15/5004* (2013.01); *G03G 15/80* (2013.01); *H02M 1/325* (2021.05)

(58) Field of Classification Search
CPC ..... G03G 15/5004; G03G 15/80; H02M 1/32; H02M 1/325
See application file for complete search history.

(56) References Cited

U.S. PATENT DOCUMENTS

| 5,893,661 | A | * | 4/1999 | Sakai ................. G03G 15/1675 399/314 |
| 2015/0147079 | A1 | | 5/2015 | Iwata et al. |
| 2016/0044745 | A1 | | 2/2016 | Nakayama et al. |
| 2017/0075261 | A1 | * | 3/2017 | Takatsuka .......... G03G 15/1615 |
| 2018/0025259 | A1 | | 1/2018 | Ogino |
| 2020/0041942 | A1 | | 2/2020 | Tanimura et al. |
| 2020/0133181 | A1 | * | 4/2020 | Nakajima .............. G03G 15/80 |
| 2020/0203949 | A1 | * | 6/2020 | Imamura ................... G05F 1/66 |

FOREIGN PATENT DOCUMENTS

| JP | 5-207655 | 8/1993 |
| JP | 11-215689 | 8/1999 |
| JP | 2008-172998 | 7/2008 |
| JP | 2009-124880 | 6/2009 |
| JP | 2015-080299 | 4/2015 |

* cited by examiner

*Primary Examiner* — Kyle J Moody
*Assistant Examiner* — Jye-June Lee
(74) *Attorney, Agent, or Firm* — IPUSA, PLLC

(57) ABSTRACT

A power supply includes a first control circuit configured to control an output voltage of the power supply, a second control circuit configured to control an output current of the power supply, a switching circuit configured to switch control of the power supply from the first control circuit to the second control circuit based on the output current of the power supply while the first control circuit controls the output voltage of the power supply, and a power supply control circuit configured to output status information indicating a failure of the power supply acquired based on the output voltage of the power supply while the second control circuit controls the output current of the power supply.

13 Claims, 10 Drawing Sheets

FIG. 4

|  | SHORT CIRCUIT IN POWER SUPPLY | SHORT CIRCUIT IN DESTINATION BOARD |
|---|---|---|
| SIGNAL DETECTED BY OUTPUT VOLTAGE DETECTION UNIT | APPROXIMATELY 0 VOLT (NOT MORE THAN FAILURE THRESHOLD) | SEVERAL VOLTS (MORE THAN FAILURE THRESHOLD) |
| DETERMINATION BY FAILURE DETERMINATION UNIT | FAILURE IN POWER SUPPLY | NO FAILURE IN POWER SUPPLY |

POWER SUPPLY AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2019-092197, filed on May 15, 2019 and 2020-069998, filed on Apr. 8, 2020, in the Japan Patent Office, the entire disclosure of each of which is hereby incorporated by reference herein.

BACKGROUND

Technical Field

Embodiments of the present disclosure generally relate to a power supply and an image forming apparatus, such as a copier, a printer, a facsimile machine, or a multifunction peripheral (MFP) having at least two of copying, printing, facsimile transmission, plotting, and scanning capabilities, that incorporates the power supply.

Description of the Related Art

In certain image forming apparatuses, when an output current malfunction is detected, an overcurrent protection circuit halts operation of the image forming apparatus.

SUMMARY

Embodiments of the present disclosure describe an improved power supply that includes a first control circuit configured to control an output voltage of the power supply, a second control circuit configured to control an output current of the power supply, a switching circuit configured to switch control of the power supply from the first control circuit to the second control circuit based on the output current of the power supply while the first control circuit controls the output voltage of the power supply, and a power supply control circuit configured to output status information indicating a failure of the power supply acquired based on the output voltage of the power supply while the second control circuit controls the output current of the power supply.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a table illustrating a relation between a source of short circuit, a signal detected by an output voltage detection unit, and a determination by a failure determination unit;

Figure 1:
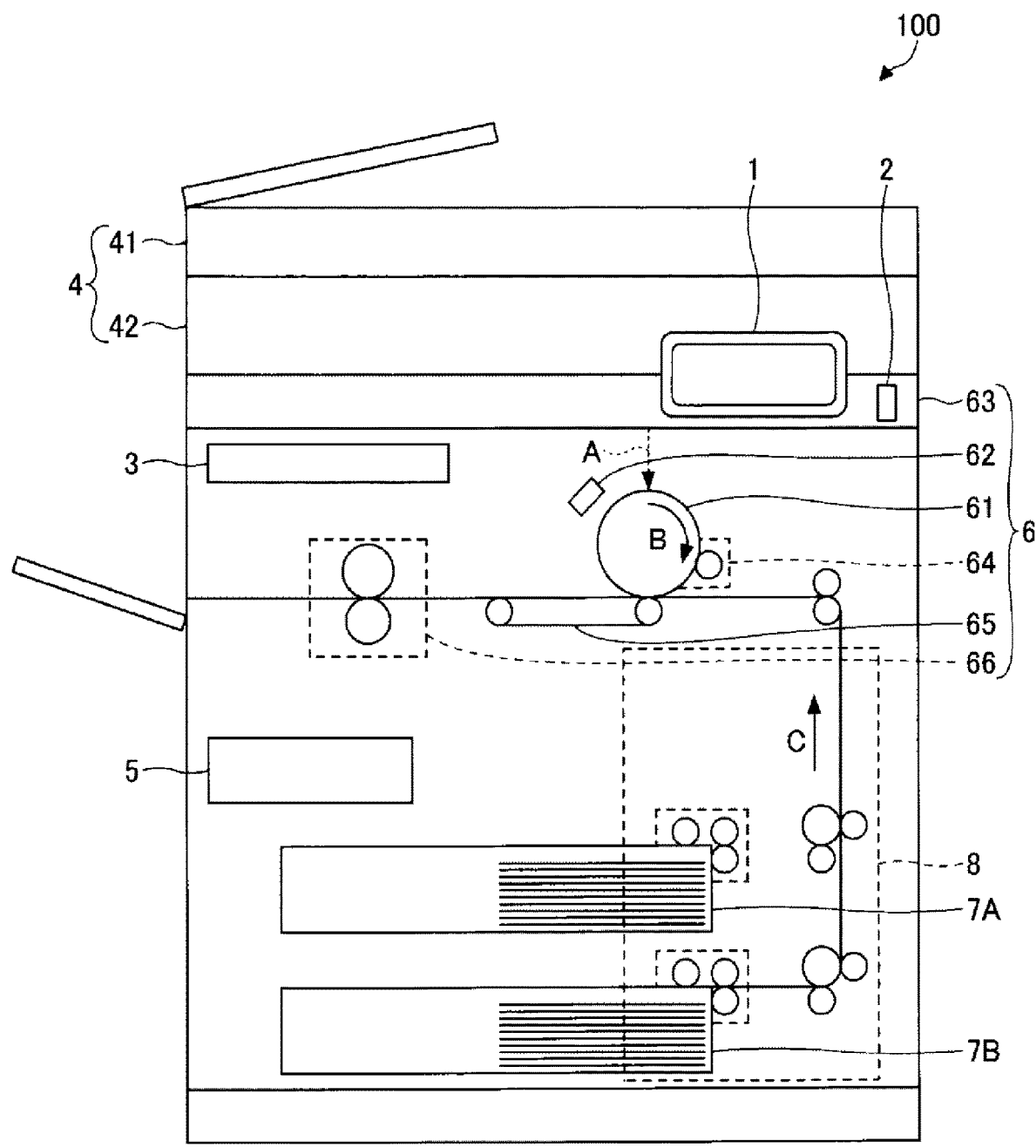
FIG. 1 is a schematic view illustrating a configuration of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views, and redundant descriptions are omitted or simplified below.

DETAILED DESCRIPTION

Embodiments of the present disclosure are described in detail with reference to drawings, using an image forming apparatus including a power supply as an example.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

FIG. 1 is a schematic view illustrating an example of configuration of an image forming apparatus 100 according to embodiments of the present disclosure.

The image forming apparatus 100 is a multifunction peripheral (MFP) having a plurality of functions such as a copy function, a facsimile (FAX) function, a print function, a scanner function, storage and delivery functions of input images, and the like. The input images include documents scanned by the scanner function and images input by the print or facsimile function.

Further, the image forming apparatus 100 is communicably connected to an external device such as a personal computer (PC) and capable of operating in response to instructions received from the external device. In the present embodiment, the "image" processed by the image forming apparatus 100 includes, in addition to image data, data without image data, that is, data including only text information.

The image forming apparatus 100 is an electrophotographic type. As a charged surface of a photoconductor drum 61 is selectively exposed, an electrostatic latent image is written on the surface of the photoconductor drum 61. Toner adheres to the electrostatic latent image, thereby forming a toner image on the photoconductor drum 61. The toner image is transferred from the photoconductor drum 61 to a recording medium such as a paper sheet.

As illustrated in FIG. 1, the image forming apparatus 100 includes a control panel 1, a startup switch 2, a controller 3, a scanner (reading device) 4, an engine controller 5, a printer unit 6, sheet trays 7A and 7B, and a sheet conveyance unit 8. The controller 3 controls the image forming apparatus 100 based on instructions input by the control panel 1. The scanner 4 scans a document. The engine controller 5 generates a control signal based on image data scanned by the scanner 4. The printer unit 6 serves as an image forming unit to form an image on a recording medium such as a paper sheet. The sheet trays 7A and 7B contain recording media. The sheet conveyance unit 8 feeds a recording medium.

The control panel 1 receives various types of input according to the user's operation and displays various types of information (for example, information indicating the received operation, information indicating the operating state of the image forming apparatus 100, and information indicating the setting status of the image forming apparatus 100). The control panel 1 includes, but is not limited to, for example, a liquid crystal display (LCD) functioning as a touch panel. For another example, the control panel 1 may include an organic electroluminescence (EL) display functioning as the touch panel. In addition to or instead of the above-described control panel 1, an operation device such as a hardware key or a display device such as a lamp may be provided.

As a user presses the startup switch 2 when the image forming apparatus 100 is off, the image forming apparatus 100 boots up. As a user presses the startup switch 2 when the image forming apparatus 100 is activated, that is, when the power is on, the image forming apparatus 100 is turned off. As described above, the image forming apparatus 100 is turned on/off, but not limited to, by pressing the startup switch 2. Alternatively, the image forming apparatus 100 may be turned on/off based on an instruction received from an external device.

The controller 3 controls the overall operation of the image forming apparatus 100. As an example, the controller 3 causes the image forming apparatus 100 to execute an operation corresponding to an input or information received by the control panel 1. As another example, the controller 3 causes the image forming apparatus 100 to execute an instruction received from an external device such as a PC.

A specific example of the controller 3 is a control board on which a circuit for controlling the image forming apparatus 100 is mounted. The circuit includes, for example, a central processing unit (CPU), a read only memory (ROM), and a random access memory (RAM). The CPU executes a program stored in the ROM or a hard disk drive (HDD), using the RAM as work area, to control the image forming apparatus 100.

The scanner 4 includes an auto document feeder (ADF) 41 and a scanner unit 42. The ADF 41 sequentially transports a document placed on a tray of the ADF 41 to a document table (platen). The scanner unit 42 optically scans the document placed on the transparent document table to generate image data.

The engine controller 5 generates a control signal for controlling the printer unit 6 and the sheet conveyance unit 8 based on the image data generated by the scanner 4. A specific example of the engine controller 5 is a circuit board for generating a control signal based on image data.

The printer unit 6 serving as the image forming unit includes the photoconductor drum 61, a charging device 62 to charge the outer surface of the photoconductor drum 61, an exposure device (writing device) 63 to expose the charged surface of the photoconductor drum 61 to write an electrostatic latent image on the photoconductor drum 61 based on the image data scanned by the scanner 4, a developing device 64 to develop the written electrostatic latent image with toner, a conveyance belt 65 to transport a recording medium on which a toner image is formed, and a fixing device 66 to fix the toner image on the recording medium, thereby forming the toner image on the recording medium.

The sheet trays 7A and 7B contain recording media before image formation. In the example in FIG. 1, the two sheet trays 7A and 7B are provided, each storing recording media having a different size. Alternatively, the number of the sheet trays may be one, or three or more.

The sheet conveyance unit 8 includes various types of rollers and transports the recording media contained in the sheet trays 7A and 7B to the printer unit 6.

A description is given of a flow of image formation, for example, in a copy mode of the image forming apparatus 100. A user operates a function switching key in the control panel 1, sequentially switches between, for example, the copy function, the print function, and the facsimile function of the image forming apparatus 100, and selects the function to operate. The user selects the copy function to set the image forming apparatus 100 in the copy mode, selects the print function to set the image forming apparatus 100 in a printer mode, and selects the facsimile function to set the image forming apparatus 100 in a facsimile mode.

In the copy mode, the scanner 4 scans an image of each document to be copied and generates image data.

The charging device 62 uniformly charges the outer surface of the photoconductor drum 61 in the dark, after which the exposure device 63 irradiates the outer surface of the photoconductor drum 61 with a light beam indicates by arrow A in FIG. 1, thus forming an electrostatic latent image thereon. The developing device 64 develops (visualizes) the electrostatic latent image with toner. As a result, a toner image is formed on the photoconductor drum 61. The toner image is then transferred from the photoconductor drum 61 onto a recording medium on the conveyance belt 65. The fixing device 66 applies heat to the toner image on the recording medium to fuse toner and fixes the toner image on the recording medium. Then, the recording medium is ejected from the image forming apparatus 100.

In the present embodiment, the printer unit 6 employs a monochrome electrophotographic method. Alternatively, image formation may be a multicolor electrophotographic method or an inkjet method, and is not limited thereto.

Further, the control panel 1 described above may be controlled by the controller 3, or the image forming apparatus 100 may include a control circuit other than the controller 3 for controlling the control panel 1. In this case, the control circuit of the controller 3 and the control circuit of the control panel 1 are communicably connected to each other, and the controller 3 controls the entire image forming apparatus 100 including the control panel 1.

The controller 3, the engine controller 5, the printer unit 6, the sheet trays 7A and 7B, and the sheet conveyance unit 8 are disposed inside the image forming apparatus 100, depicted as though visible through the exterior of the image forming apparatus 100 in FIG. 1.

Figure 2:
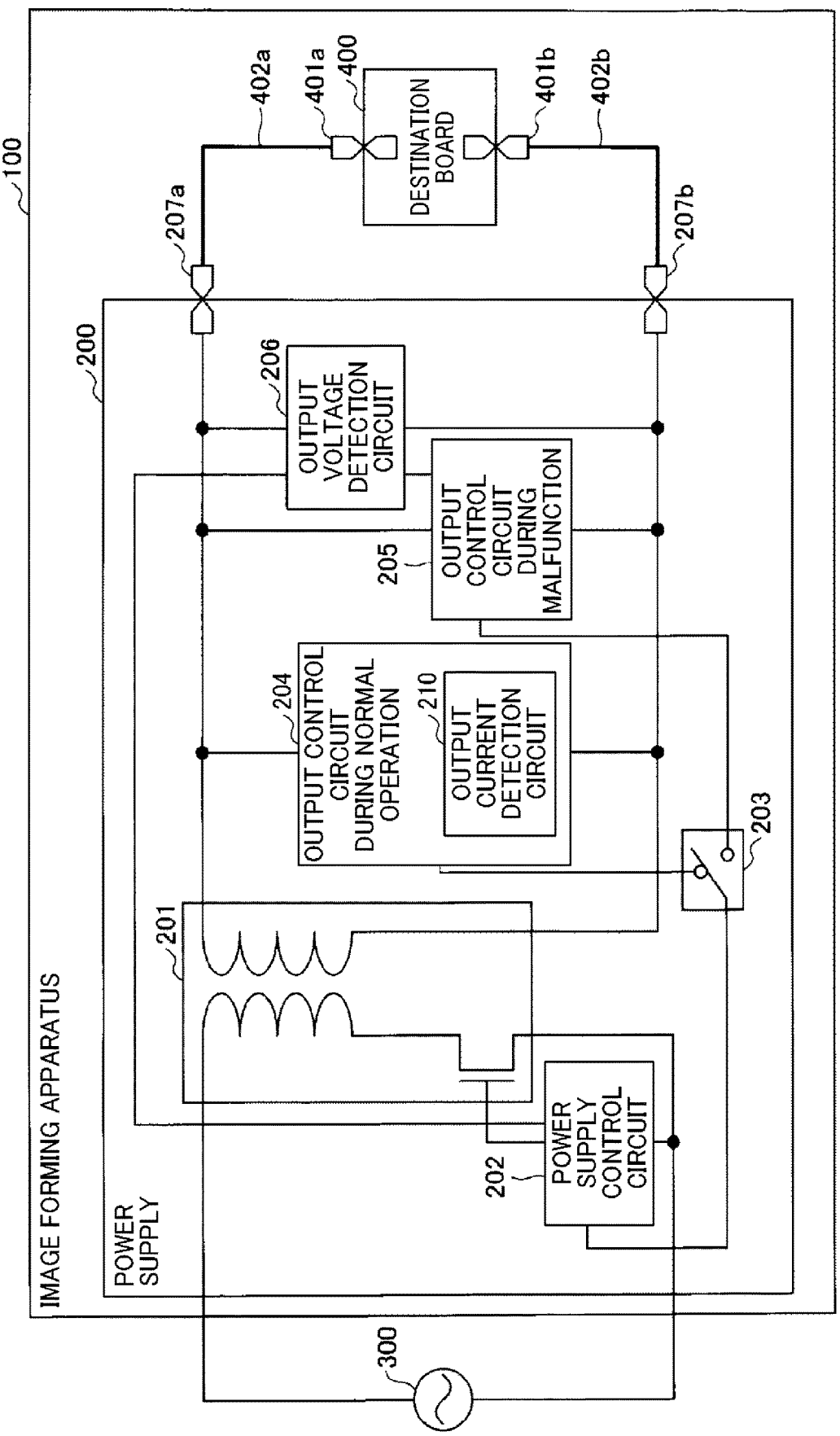
FIG. 2 is a block diagram illustrating a configuration of a power supply of the image forming apparatus in FIG. 1.

FIG. 2 is a schematic view illustrating an example of configuration of a power supply 200 included in the image forming apparatus 100 according to the present embodiment. As illustrated in FIG. 2, the power supply 200 includes a transformer circuit 201, a power supply control circuit 202, a switching circuit 203, an output control circuit during normal operation 204, an output control circuit during malfunction 205, and an output voltage detection circuit 206.

The transformer circuit 201 is an electric circuit that turns on and off an alternating current (AC) voltage input from a commercial power source 300, converts the AC voltage into a direct current (DC) voltage having a predetermined voltage, and outputs the DC voltage according to a control signal from the power supply control circuit 202. For example, the transformer circuit 201 converts an AC voltage of 100 V input from the commercial power source 300 into a DC voltage of 24 V or 5 V, and outputs the DC voltage. The transformer circuit 201 may include a rectifier circuit and a smoothing circuit for stabilizing the output DC voltage.

The power supply control circuit 202 is an integrated circuit (IC) that outputs a signal to the transformer circuit 201. The signal causes the transformer circuit 201 to turn on and off according to a desired output voltage. The power supply control circuit 202 controls the switching operation of the switching circuit 203 in response to a value detected by an output current detection circuit 210. Further, the power supply control circuit 202 acquires status information indicating whether a failure is present or absent in the power supply 200 based on an output voltage detected by the output voltage detection circuit 206. The power supply control circuit 202 can output the acquired result to the control panel 1 of the image forming apparatus 100.

The switching circuit 203 is an electric circuit that feeds back a DC voltage input from one of the output control circuit during normal operation 204 and the output control circuit during malfunction 205 to the power supply control circuit 202 under the control of the power supply control circuit 202.

The output control circuit during normal operation 204 is a feedback control circuit that controls the output of the power supply 200 when the power supply 200 operates normally. The output current detection circuit 210 is an electric circuit that detects a current output from the power supply 200. The output current detection circuit 210 is disposed in the output control circuit during normal operation 204. Alternatively, the output current detection circuit 210 may be disposed outside the output control circuit during normal operation 204.

The output control circuit during malfunction 205 is a feedback control circuit that controls the output of the power supply 200 when the power supply 200 does not operate normally due to breakage of components in the power supply 200 or a destination board 400, or a short circuit of an input/output connector. The output voltage detection circuit 206 is an electric circuit that detects the voltage output from the power supply 200.

The output of the power supply 200 is input to the destination board 400 via a power supply connector 207a, a harness 402a, and a supply connector 401a. That is, the output voltage of the power supply 200 is supplied to the destination board 400. The current flowing through the destination board 400 is returned to the power supply 200 via a supply connector 401b, a harness 402b, and a power supply connector 207b. The destination board 400 is a circuit board included in the controller 3, the engine controller 5, or the like of the image forming apparatus 100.

Figure 3:
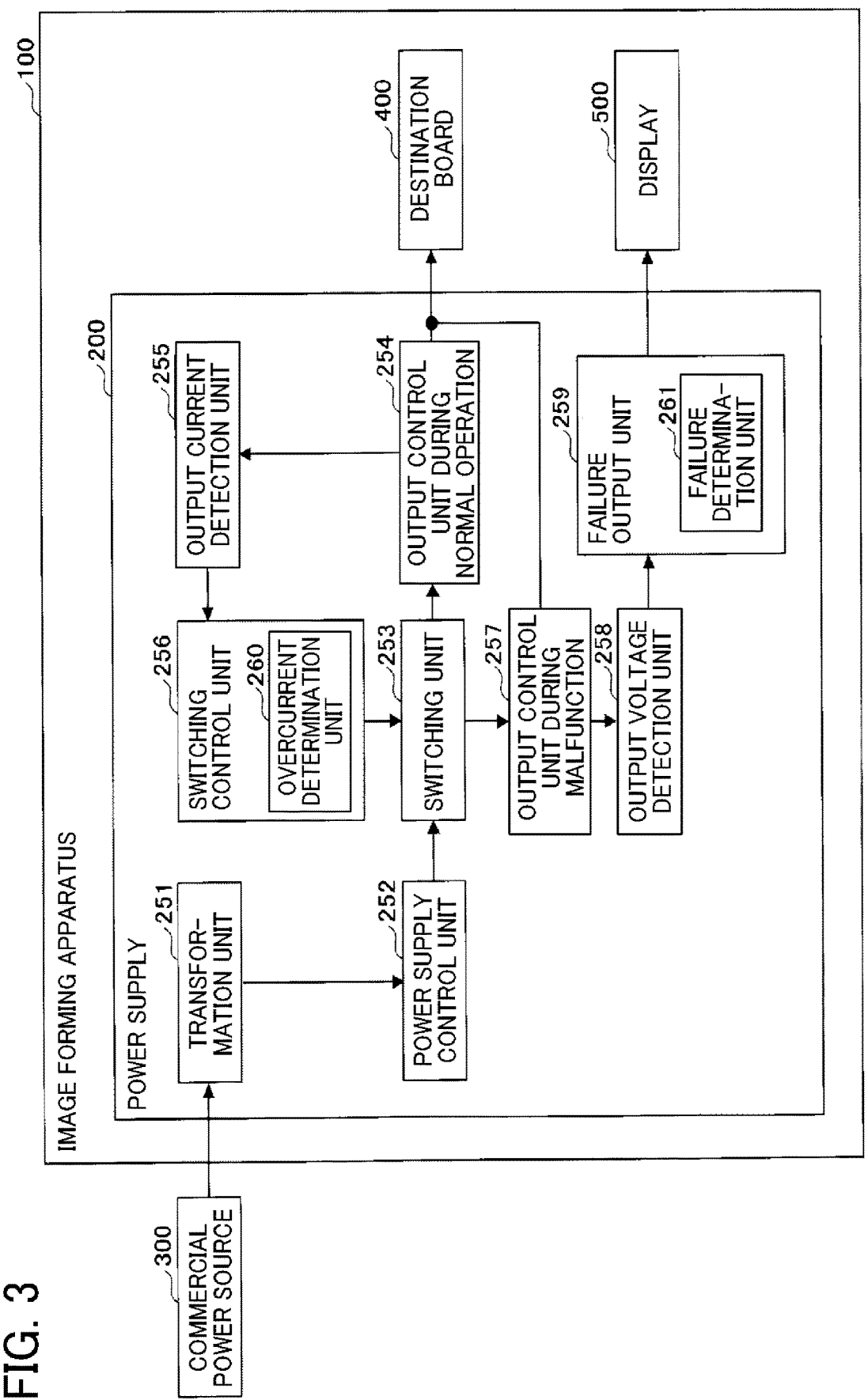
FIG. 3 is a block diagram illustrating a functional configuration of a power supply of an image forming apparatus according to a first embodiment of the present disclosure.

FIG. 3 is a block diagram illustrating the functional configuration of the power supply 200 of the image forming apparatus 100 according to a first embodiment of the present disclosure. Note that all or a part of each functional block may be functionally or physically dispersed and combined in an arbitrary unit.

As illustrated in FIG. 3, the power supply 200 includes a transformation unit 251, a power supply control unit 252, a switching unit 253, an output control unit during normal operation 254, an output current detection unit 255, and a switching control unit 256. In addition, the power supply 200 includes an output control unit during malfunction 257, an output voltage detection unit 258, and a failure output unit 259.

The transformation unit 251 is implemented by the transformer circuit 201 and the like. The transformation unit 251 converts an AC voltage input from the commercial power source 300 into a DC voltage having a predetermined voltage according to the control signal (on/off signal) from the power supply control unit 252, and outputs the DC voltage. The power supply control unit 252 is implemented by the power supply control circuit 202 and the like. The power supply control unit 252 stabilizes the DC voltage input from the transformation unit 251 and outputs the stabilized DC voltage to the switching unit 253. The switching unit 253 is implemented by the switching circuit 203 and the like.

The switching unit 253 outputs the DC voltage input from the power supply control unit 252 to one of the output control unit during normal operation 254 and the output control unit during malfunction 257 under the control of the switching control unit 256. When the power supply 200 operates normally, the switching unit 253 outputs the DC voltage from the power supply control unit 252 to the output control unit during normal operation 254. When the power supply 200 does not operate normally, the switching unit 253 outputs the DC voltage from the power supply control unit 252 to the output control unit during malfunction 257.

The output control unit during normal operation 254 is implemented by the output control circuit during normal operation 204 and the like. The output control unit during normal operation 254 controls the output of the power supply 200 when the power supply 200 operates normally (i.e., during normal operation), which is an example of a first control circuit (unit). In the present embodiment, the output control unit during normal operation 254 controls the power supply 200 at a constant voltage to output a voltage having a predetermined voltage to the destination board 400 of the image forming apparatus 100. Alternatively, the output control unit during normal operation 254 may control the power supply 200 at a constant current to output a predetermined current to the destination board 400 of the image forming apparatus 100.

The output current detection unit 255 is implemented by the output current detection circuit 210 and the like. The output current detection unit 255 detects the current output from the power supply 200 and outputs the detection signal to the switching control unit 256 when the output control unit during normal operation 254 controls the output of the power supply 200.

The switching control unit 256 is implemented by the power supply control circuit 202 and the like. The switching control unit 256 controls the switching operation of the switching unit 253 in response to the detection signal from the output current detection unit 255. The switching control unit 256 includes an overcurrent determination unit 260.

If the power supply 200 does not operate normally due to breakage of components in the power supply 200 or the destination board 400, or a short circuit of the input/output connector, an overcurrent flows through the output control circuit during normal operation 204. The overcurrent determination unit 260 determines whether the current indicated by the detection signal of output current from the output current detection unit 255 equals or exceeds an overcurrent threshold (i.e., a second threshold). The overcurrent threshold is determined in advance by experiments or the like. Depending on the acquired determination, the switching control unit 256 operates the switching unit 253 when the current equals or exceeds the overcurrent threshold, and outputs the DC voltage from the power supply control unit 252 to the output control unit during malfunction 257 to switch a control source of the power supply 200 to the output control unit during malfunction 257.

The output control unit during malfunction 257 is implemented by the output control circuit during malfunction 205. The output control unit during malfunction 257 controls the output of the power supply 200 when the power supply 200 does not operate normally (i.e., during malfunction), which is an example of a second control circuit (unit). If the power supply 200 does not operate normally, an overcurrent flows, so that the destination board 400 and the power supply 200 may be secondarily damaged.

Therefore, in the present embodiment, the output control unit during malfunction 257 controls the power supply 200 at a constant current to output a predetermined current having a predetermined value to the destination board 400 of the image forming apparatus 100. The predetermined value is a sufficiently small current that can prevent the destination board 400 and the power supply 200 from being secondarily damaged. The predetermined value is determined in advance by experiments, simulations, or the like. As described above, when the power supply 200 does not operate normally, the sufficiently small current having the predetermined value is output from the power supply 200, so that the destination board 400 and the power supply 200 are prevented from being secondarily damaged. The above-described constant current control is an example, and the output control unit during malfunction 257 may control the power supply 200 at a constant voltage.

The output voltage detection unit 258 is implemented by the output voltage detection circuit 206 and the like. The output voltage detection unit 258 detects the voltage output from the power supply 200 and outputs the detection signal to the failure output unit 259 when the output control unit during malfunction 257 controls the output of the power supply 200.

The failure output unit 259 as an information indicating means is implemented by the power supply control circuit 202 and the like. The failure output unit 259 outputs information indicating a failure of the power supply 200 (i.e., status information) based on the output voltage of the power supply 200. The failure output unit 259 includes a failure determination unit 261.

If a failure such as a short circuit occurs in the destination board 400, a voltage of several volts is generated at the output terminal of the power supply 200 due to the impedance of the destination board 400 and the harnesses 402a and 402b connecting the power supply 200 and the destination board 400 in the current path. On the other hand, if a failure such as a short circuit occurs in the power supply 200, the voltage generated at the output terminal of the power supply 200 becomes close to zero.

Therefore, the failure determination unit 261 determines whether or not the voltage indicated by the detection signal of output voltage from the output voltage detection unit 258 is equal to or less than a failure threshold (i.e., a first threshold). The failure threshold is determined in advance by experiments or the like. The failure output unit 259 outputs status information that a failure is present in the power supply 200 to the display 500 depending on the acquired determination when the voltage is equal to or less than the failure threshold. When the voltage is more than the failure threshold, the failure output unit 259 outputs status information that a failure is absent in the power supply 200 to the display 500.

The display 500 is implemented by the control panel 1 and the like. The display 500 displays status information indicating a failure of the power supply 200 input from the failure output unit 259 on the screen of the control panel 1 so that a technician or the like can see the status information to maintain the image forming apparatus 100. This allows the technician to determine whether the failure is present or absent in the power supply 200 by which the power supply 200 does not operate normally. The output of the status information by the failure output unit 259 is not limited to displaying the status information on the display 500, and may be performed by turning on a light emitting diode provided in the image forming apparatus 100.

FIG. 4 is a table illustrating a relation between a source of short circuit, and the detection signal detected by the output voltage detection unit 258 and the determination by the failure determination unit 261. As illustrated in FIG. 4, when a short circuit occurs in the power supply 200, the detection signal from the output voltage detection unit 258 indicates a voltage of almost 0 V. Therefore, since the voltage indicated by the detection signal is equal to or less than the failure threshold, the failure determination unit 261 determines that a failure is present in the power supply 200. On the other hand, when a short circuit occurs in the destination board 400, the detection signal from the output voltage detection unit 258 indicates a voltage of several volts. Since the voltage indicated by the detection signal is more than the failure threshold, the failure determination unit 261 determines that a failure is absent in the power supply 200.

Figure 5:
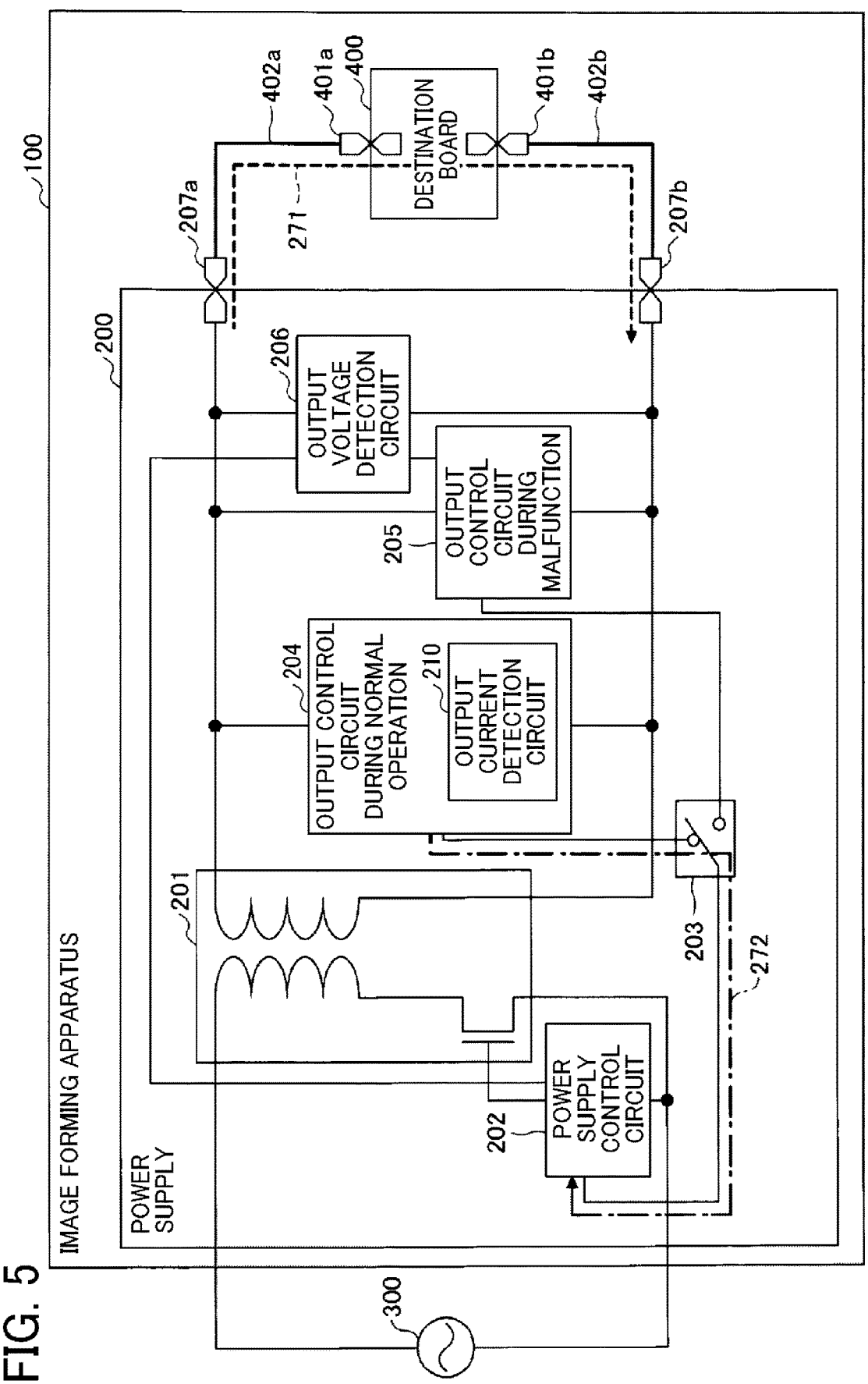
FIG. 5 is a block diagram illustrating an example of operation of the power supply during normal operation.

FIG. 5 is a block diagram illustrating an example of operation of the power supply 200 during normal operation. Arrow 271 illustrated with the broken line in FIG. 5 indicates current flow output from the power supply 200 and returned to the power supply 200 through the destination board 400 when the power supply 200 operates normally. Arrow 272 illustrated with the alternate long and short dash line indicates that the detection signal of output current of the power supply 200 detected by the output current detection circuit 210 is transmitted via the switching circuit 203 to the power supply control circuit 202 when the power supply 200 operates normally.

As illustrated in FIG. 5, when the power supply 200 operates normally, the DC voltage output from the power supply control circuit 202 (power supply control unit 252) is output to the output control circuit during normal operation 204 via the transformer circuit 201. At that time, the output control circuit during malfunction 205 and the output voltage detection circuit 206 does not operate. The current output from the power supply 200 is detected by the output current detection circuit 210. The detection signal from the output current detection circuit 210 is input to the power supply control circuit 202 (switching control unit 256) via the switching circuit 203, and the power supply control circuit 202 determines whether an overcurrent has occurred.

Figure 6:
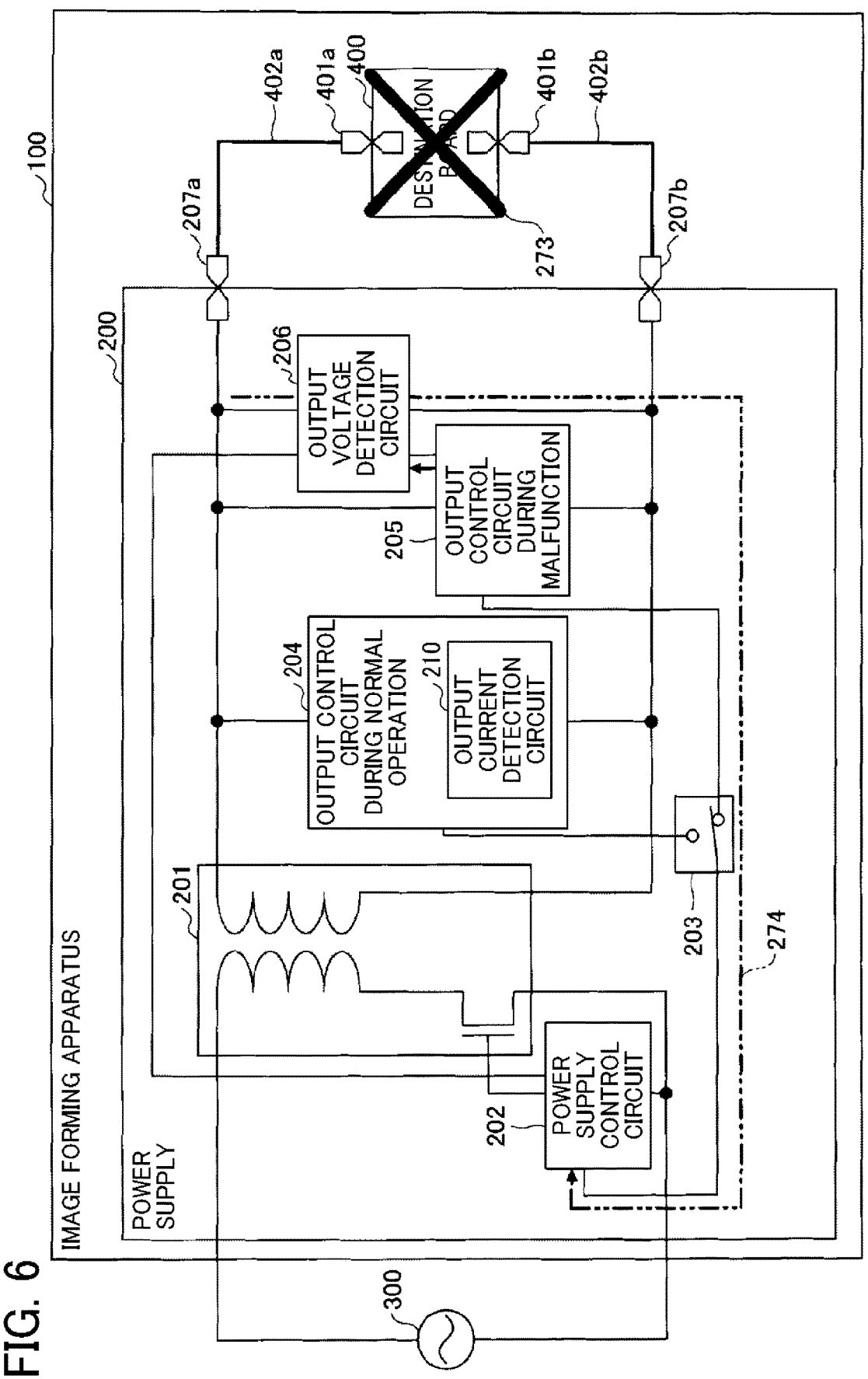
FIG. 6 is a block diagram illustrating an example of operation of the power supply during malfunction in which a failure is in a destination board.

FIG. 6 is a block diagram illustrating an example of operation of the power supply 200 during malfunction in which a failure is present in the destination board 400. In FIG. 6, a mark 273 indicated by "x" indicates that a failure such as a short circuit occurs in the destination board 400.

Arrow 274 indicated by the alternate long and two short dashes line indicates that the detection signal of output voltage of the power supply 200 detected by the output voltage detection circuit 206 is transmitted to the power supply control circuit 202 when the power supply 200 does not operate normally.

If a failure such as a short circuit occurs in the destination board 400 when the power supply 200 operates normally, the output current detection circuit 210 detects an overcurrent due to the failure. The power supply control circuit 202 (the overcurrent determination unit 260) determines whether the current indicated by the detection signal from the output current detection circuit 210 equals or exceeds the overcurrent threshold. When the current equals or exceeds the overcurrent threshold, the power supply control circuit 202 (the switching control unit 256) operates the switching circuit 203, thereby outputting the DC voltage, which is input from the power supply control circuit 202 (the power supply control unit 252) to the transformer circuit 201, is output to the output control circuit during malfunction 205. At that time, the connection between the power supply control circuit 202 and the output control circuit during normal operation 204 is disconnected, and the input of the detection signal by the output current detection circuit 210 to the power supply control circuit 202 is also stopped.

The output control circuit during malfunction 205 starts constant current control of the output current of the power supply 200 in response to the input of the DC voltage from the power supply control circuit 202 (the power supply control unit 252). Further, the output voltage detection circuit 206 starts detecting the voltage output from the power supply 200 in response to the start of the constant current control by the output control circuit during malfunction 205, and outputs the detection signal to the power supply control circuit 202 (the failure output unit 259).

The power supply control circuit 202 (the failure determination unit 261) determines whether the voltage indicated by the detection signal from the output voltage detection circuit 206 is equal to or less than the failure threshold. In the example illustrated in FIG. 6, since a failure is in the destination board 400, the voltage indicated by the detection signal from the output voltage detection circuit 206 is not equal to or less than the failure threshold. Therefore, the power supply control circuit 202 (the failure output unit 259) outputs status information indicating that there is no failure in the power supply 200 depending on the acquired determination.

Figure 7:
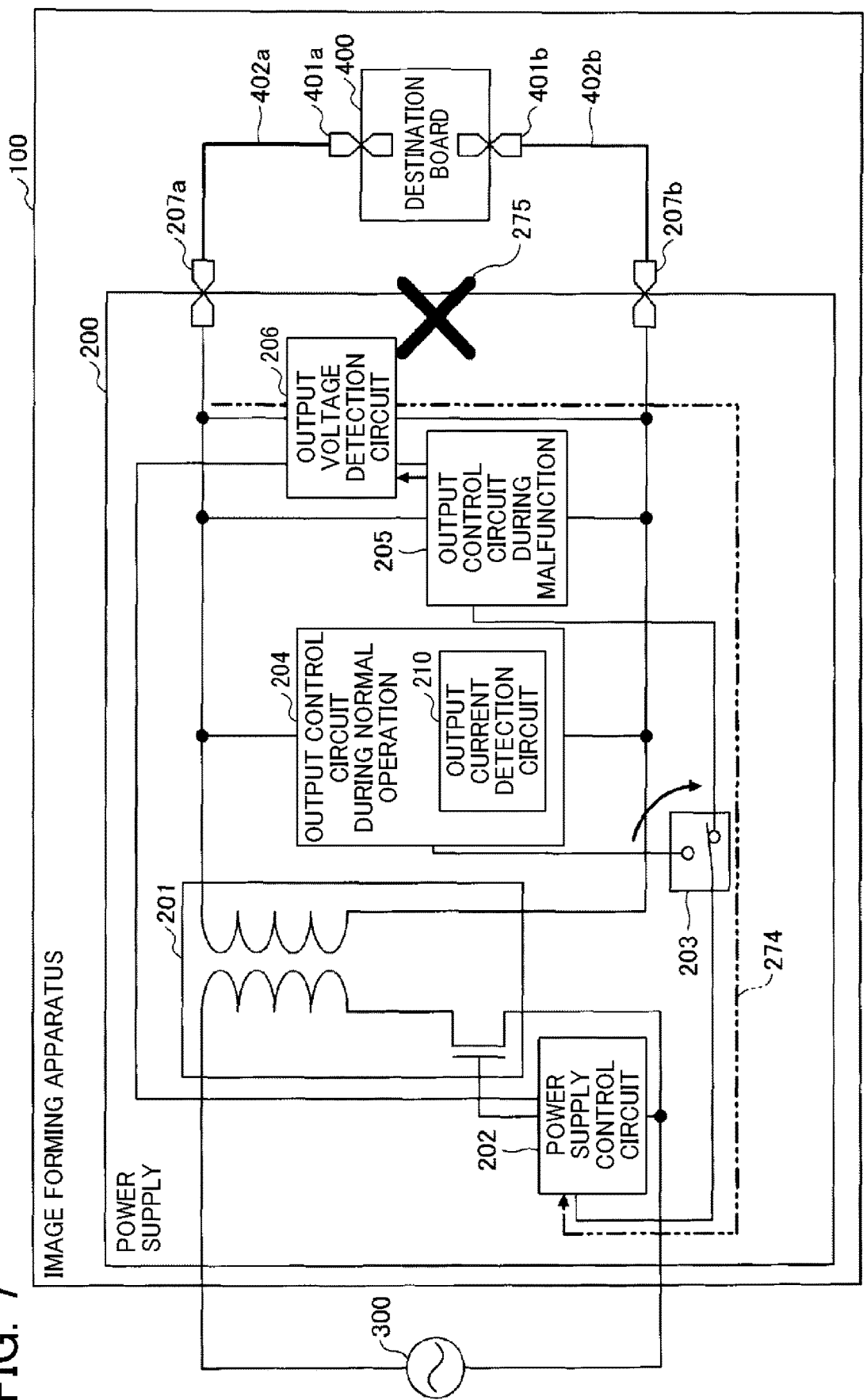
FIG. 7 is a block diagram illustrating an example of operation of the power supply during malfunction in which a failure is in the power supply.

FIG. 7 is a block diagram illustrating an example of operation of the power supply 200 during malfunction in which a failure is in the power supply 200. In FIG. 7, a mark 275 indicated by "x" indicates that a failure such as a short circuit occurs in the power supply 200.

If a failure such as a short circuit occurs in the power supply 200 when the power supply 200 operates normally, the output current detection circuit 210 detects an overcurrent due to the failure. The power supply control circuit 202 (the overcurrent determination unit 260) determines whether the current indicated by the detection signal from the output current detection circuit 210 equals or exceeds the overcurrent threshold. When the current equals or exceeds the overcurrent threshold, the power supply control circuit 202 (the switching control unit 256) operates the switching circuit 203, thereby outputting the DC voltage, which is input from the power supply control circuit 202 (the power supply control unit 252) to the switching circuit 203, is transmitted to the output control circuit during malfunction 205. At that time, the connection between the power supply control circuit 202 and the output control circuit during normal operation 204 is disconnected, and the input of the detection signal by the output current detection circuit 210 to the power supply control circuit 202 is also stopped.

The output control circuit during malfunction 205 starts constant current control of the output current of the power supply 200 in response to the input of the DC voltage from the power supply control circuit 202 (the power supply control unit 252). Further, the output voltage detection circuit 206 starts detecting the voltage output from the power supply 200 in response to the start of the constant current control by the output control circuit during malfunction 205, and outputs the detection signal to the power supply control circuit 202 (the failure output unit 259).

The power supply control circuit 202 (the failure determination unit 261) determines whether the voltage indicated by the detection signal from the output voltage detection circuit 206 is equal to or less than the failure threshold. In the example illustrated in FIG. 7, since a failure is in the power supply 200, the voltage indicated by the detection signal from the output voltage detection circuit 206 is equal to or less than the failure threshold. Therefore, the power supply control circuit 202 (the failure output unit 259) outputs status information indicating that there is a failure in the power supply 200 depending on the acquired determination.

Figure 8:
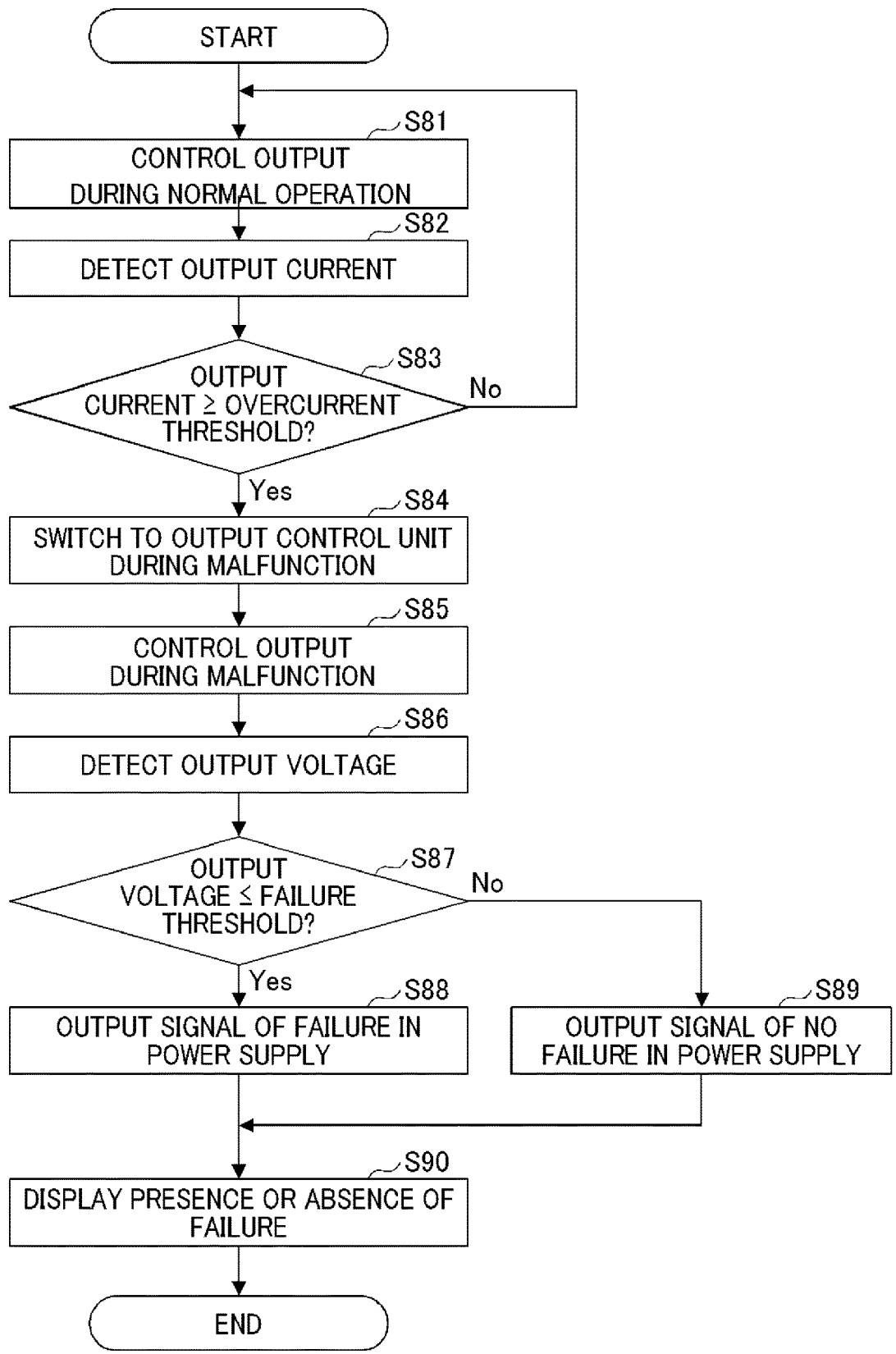
FIG. 8 is a flowchart illustrating an example of processes performed by the power supply of the image forming apparatus according to the first embodiment.

FIG. 8 is a flowchart of an example of operation of the power supply 200 according to the first embodiment.

In step S81, the output control unit during normal operation 254 controls the output of the power supply 200.

In step S82, the output current detection unit 255 detects the current output from the power supply 200 and outputs the detection signal to the switching control unit 256.

In step S83, the overcurrent determination unit 260 determines whether the current indicated by the detection signal of output current from the output current detection unit 255 equals or exceeds the overcurrent threshold.

In step S83, if the overcurrent determination unit 260 determines that the current is less than the overcurrent threshold (No in step S83), the process returns to step S81, and the processes in steps S81 and the subsequent steps are repeated.

On the other hand, if the overcurrent determination unit 260 determines that the current equals or exceeds the overcurrent threshold (Yes in step S83), the switching control unit 256 operates the switching unit 253, and the switching unit 253 outputs the DC voltage from the power supply control unit 252 to the output control unit during malfunction 257 to switch the control source of the power supply 200 to the output control unit during malfunction 257 in step S84.

In step S85, the output control unit during malfunction 257 performs constant current control such that the output current of the power supply 200 has the predetermined current.

In step S86, the output voltage detection unit 258 detects the voltage output from the power supply 200 and outputs the detection signal to the failure output unit 259.

In step S87, the failure determination unit 261 determines whether the voltage indicated by the detection signal of output voltage from the output voltage detection unit 258 is equal to or less than the failure threshold.

In step S87, if the failure determination unit 261 determines that the voltage is equal to or less than the failure threshold (Yes in step S87), the failure output unit 259 outputs status information that the failure is present in the power supply 200 to the display 500 in step S88.

On the other hand, in step S87, if the failure determination unit 261 determines that the voltage is more than the failure threshold (No in step S87), the failure output unit 259 outputs status information that the failure is absent the power supply 200 to the display 500 in step S89.

In step S90, the display 500 displays the status information of the power supply 200 input from the failure output unit 259 on the screen of the control panel 1 so that a technician or the like can see the status information to maintain the image forming apparatus 100.

As described above, the power supply 200 of the image forming apparatus 100 allows the technician to determine whether the failure is present or absent in the power supply 200 when the power supply 200 does not operate normally.

In comparative image forming apparatuses, when an output current malfunction of a power supply is detected, an overcurrent protection circuit operates, thereby stopping the operation of the image forming apparatus. Further, the overcurrent protection circuit stops outputting an output voltage when an overload occurs with a compact configuration without increasing the circuit scale and the number of components of the power supply. As a result, however, in the comparative image forming apparatuses, it may be difficult to determine whether the output current malfunction is caused by the power supply or a destination board to which the power is supplied. In some cases, the technician does not sufficiently analyze the failure, for example by disassembling the image forming apparatus, because the technician is required to complete work in a short time. As a result, the technician may needlessly replace the power supply without a failure.

In the present embodiment, when the output current of the power supply 200 equals or exceeds the overcurrent threshold, the switching unit 253 switches the control source of the output of the power supply 200 from the output control unit during normal operation 254 to the output control unit during malfunction 257. Then, when the output voltage of the power supply 200 is equal to or less than the failure threshold while the output control unit during malfunction 257 performs the control, the failure output unit 259 outputs status information that the failure is present in the power supply 200 to the display 500, causing the control panel 1 to display the status information. Thus, the power supply 200 of the image forming apparatus 100 allows a technician to determine whether the failure is present or absent in the power supply 200 when the power supply 200 does not operate normally.

Further, when a failure relate to the power supply 200 occurs in the image forming apparatus 100, the power supply 200 without the failure is not needlessly replaced, thereby reducing the replacement cost. Since the technician can determine whether a failure is present or absent in the power supply 200 without a complicated analysis, the technician can deal with the failure appropriately and satisfy the request for completing work to correct the failure in a short time.

Further, in the present embodiment, when a failure occurs in the power supply 200, the output control unit during malfunction 257 controls the power supply 200 at constant current and causes the power supply 200 to output the predetermined current having the predetermined sufficiently small current. This control prevents the destination board 400 and the power supply 200 from being secondarily damaged by a large current.

An image forming apparatus according to a second embodiment of the present disclosure is described below. Descriptions of elements identical or similar to those of above-described embodiments are omitted to avoid redundancy.

Figure 9:
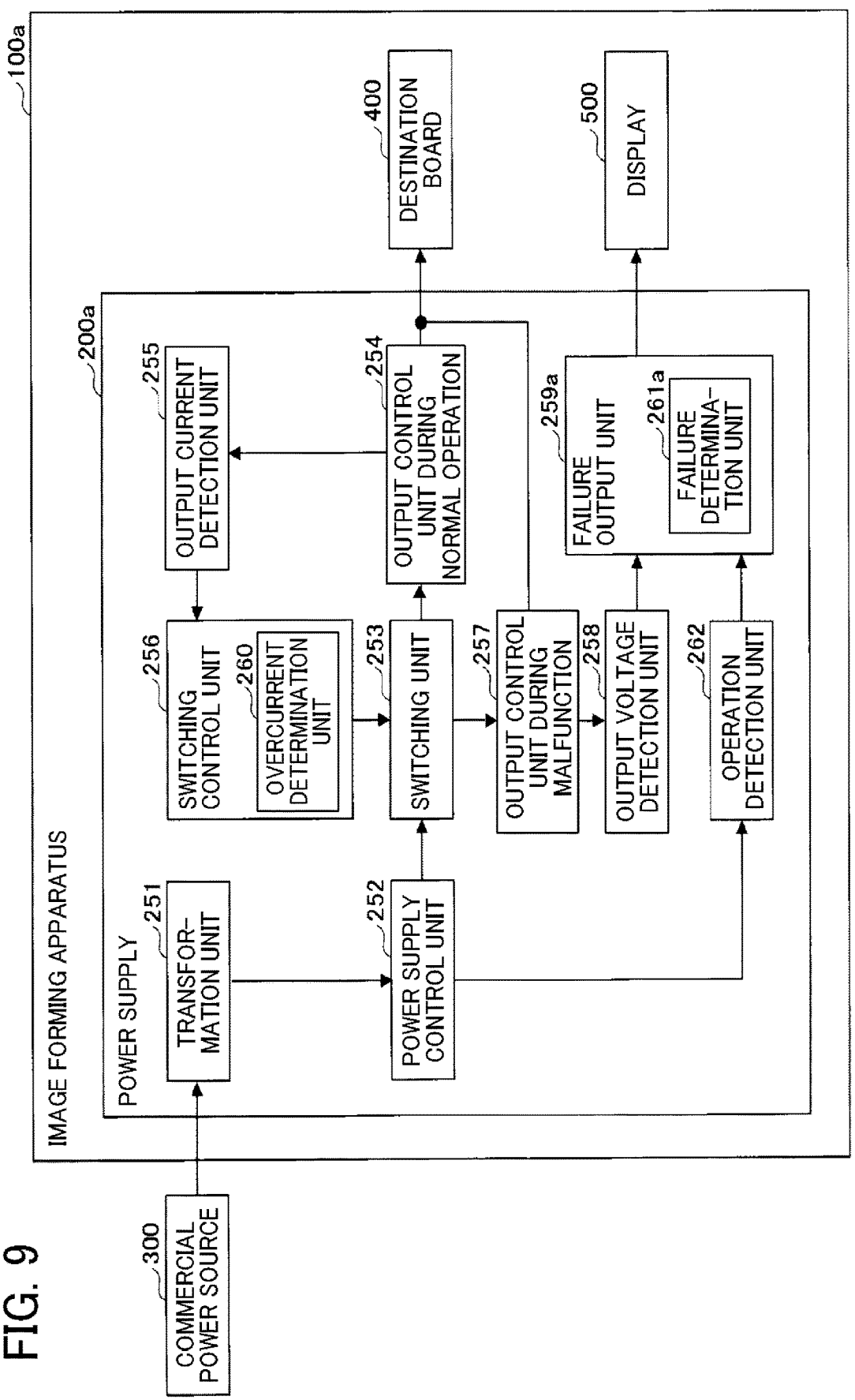
FIG. 9 is a block diagram illustrating a functional configuration of a power supply of an image forming apparatus according to a second embodiment of the present disclosure.

FIG. 9 is a block diagram illustrating a functional configuration of a power supply 200a of an image forming apparatus 100a according to the second embodiment. As illustrated in FIG. 9, the power supply 200a includes an operation detection unit 262 and a failure output unit 259a.

The operation detection unit 262 detects an operating state of the power supply control unit 252 and outputs the detection result to the failure output unit 259a, which is an example of a third control source. The power supply control circuit 202 that implements the power supply control unit 252 outputs a pulse signal indicating that the power supply control unit 252 is in operation during operation. Receiving the pulse signal, the operation detection unit 262 can detect the operating state of the power supply control unit 252.

The failure output unit 259a is implemented by the power supply control circuit 202 and the like. The failure output unit 259a outputs status information of the power supply 200a acquired based on the output voltage of the power supply 200a and the signal indicating the operating state of the power supply control unit 252 output by the operation detection unit 262. The failure output unit 259a includes a failure determination unit 261a.

The failure determination unit 261a determines whether or not the voltage indicated by the detection signal of output voltage from the output voltage detection unit 258 is more than the failure threshold and whether or not the power supply control unit 252 is in operation. The failure threshold is determined in advance. The failure output unit 259a outputs status information that a failure is absent in the power supply 200a to the display 500 depending on the acquired determination when the voltage is more than the failure threshold and the power supply control unit 252 is in operation. When the voltage is equal to or less than the failure threshold or the power supply control unit 252 is not in operation, the failure output unit 259 outputs status information that the failure is present in the power supply 200a to the display 500.

Even if the output control circuit during normal operation 204 or the output control circuit during malfunction 205 is damaged, an output current from the power supply 200a may flow to the destination board 400 depending on the state of the damage. In this case, although the output control circuit during normal operation 204 or the output control circuit during malfunction 205 is damaged, the output voltage detection unit 258 detects an output voltage of several volts caused by the impedance of the destination board 400 or the like. Therefore, in the above-described embodiment, status information indicating that there is no failure in the power supply 200 may be erroneously output.

On the other hand, in the present embodiment, the power supply 200a determines whether a failure is present or absent in the power supply 200a based on not only the output voltage of the power supply 200a but also the operating state of the power supply control unit 252. Thus, the power supply 200a does not erroneously determine the presence or absence of failure in the power supply 200a although the output current flows to the destination board 400 even when the power supply control unit 252 is not in operation due to breakage of the output control circuit during normal operation 204 or the output control circuit during malfunction 205.

Figure 10:
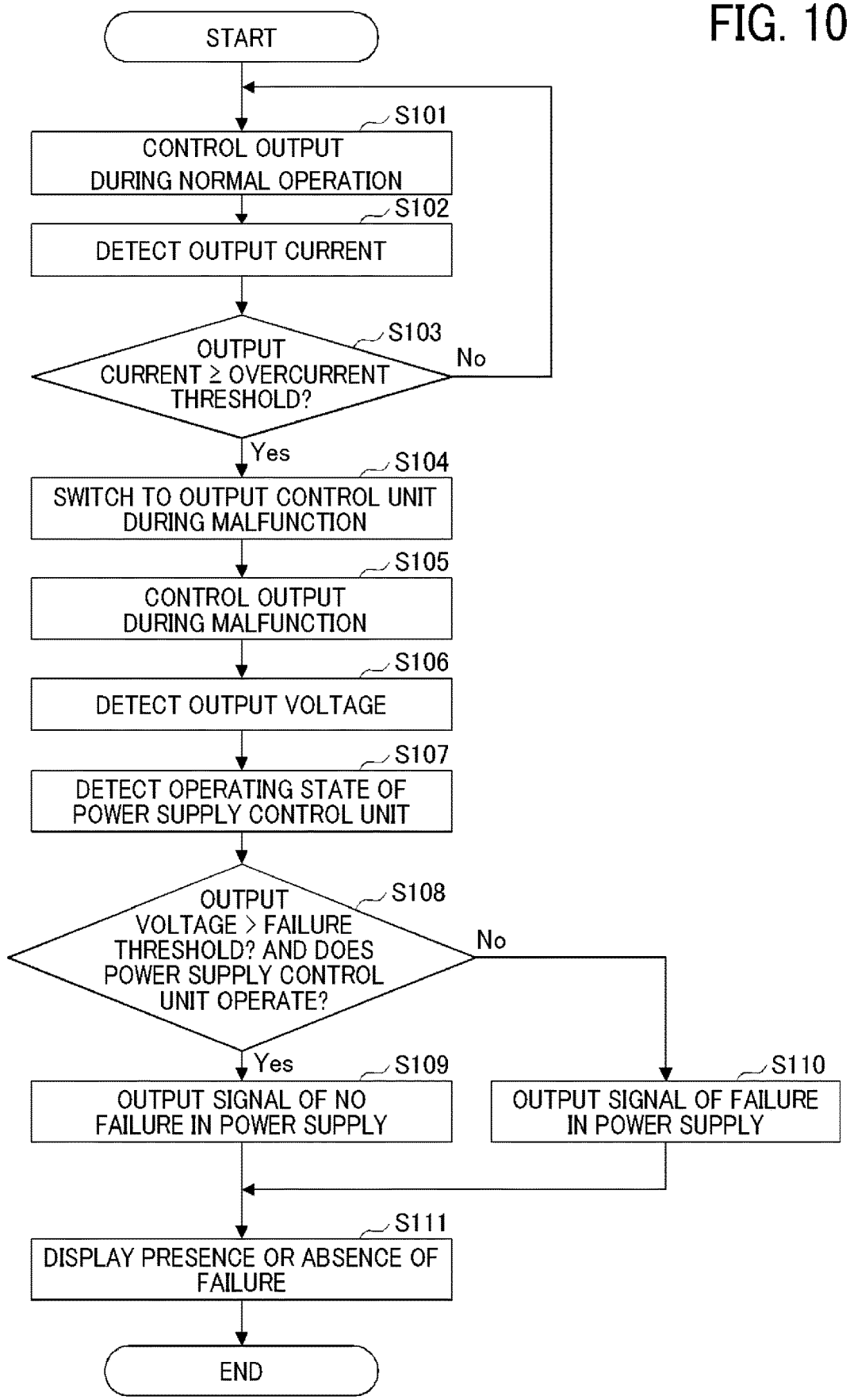
FIG. 10 is a flowchart illustrating an example of processes performed by the power supply of the image forming apparatus according to the second embodiment.

FIG. 10 is a flowchart of an example of operation of the power supply 200a according to the second embodiment. Note that the processes in steps S101 to S106 in FIG. 10 are identical to the processes in steps S81 to S86 in FIG. 8, and thus redundant description is omitted here.

In step S107, the operation detection unit 262 detects the operating state of the power supply control unit 252, and outputs the detection result to the failure output unit 259a.

Note that the order of the processes of step S106 and step S107 may be appropriately changed, or both steps may be performed in parallel.

Subsequently, in step S108, the failure determination unit 261a determines whether or not the voltage indicated by the detection signal of output voltage from the output voltage detection unit 258 is more than the failure threshold determined in advance and whether or not the power supply control unit 252 is in operation.

In step S108, the failure determination unit 261a determines that the voltage is more than the failure threshold and the power supply control unit 252 is in operation (Yes in step S108), the failure output unit 259a outputs status information that the failure is absent in the power supply 200 to the display 500 in step S109.

On the other hand, the failure determination unit 261a determines that the voltage is not more than the failure threshold or the power supply control unit 252 is not in operation (No in step S108), the failure output unit 259a outputs status information that the failure is present in the power supply 200 to the display 500 in step S110.

In step S111, the display 500 displays the status information of the power supply 200a input from the failure output unit 259a on the screen of the control panel 1 so that a technician or the like can see the status information to maintain the image forming apparatus 100a.

As described above, the power supply 200a of the image forming apparatus 100a allows the technician to determine whether the failure is present or absent in the power supply 200a when the power supply 200a does not operate normally.

As described above, in the present embodiment, the power supply 200a acquires status information indicating a failure of the power supply 200a based on the output voltage of the power supply 200a and the operating state of the power supply control unit 252. As a result, the power supply 200a does not erroneously determine the presence or absence of failure in the power supply 200a although the output current flows to the destination board 400 even when the power supply control unit 252 is not in operation due to breakage of the output control circuit during normal operation 204 or the output control circuit during malfunction 205.

The effects other than those described above are the same as those described in the first embodiment.

As described above, according to the present disclosure, when an output current malfunction of a power supply occurs, the power supply can determine whether a failure is present or absent in the power supply.

The above-described embodiments are just examples and the present disclosure is not limited to the above embodiments described specifically. Modifications and variations of the embodiments can be made without departing from the spirit and scope of the disclosure described in the claims unless limited in the above description.

Each function of the above-described embodiments can be implemented by one or more processing circuits. Here, the term "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit components arranged to perform the recited functions.

Moreover, any one of the processes described in the above-described methods may be performed in various other ways, for example, in an order different from that which is described above.

What is claimed is:

1. A power supply comprising:
 a first control circuit configured to control an output voltage of the power supply;
 a second control circuit configured to control an output current of the power supply;
 a switching circuit configured to switch control of the power supply from the first control circuit to the second control circuit based on the output current of the power supply while the first control circuit controls the output voltage of the power supply; and
 a power supply control circuit configured to determine that a malfunction has occurred in the power supply upon detecting the output voltage of the power supply is equal to or lower than a threshold, and to output status information indicating the malfunction of the power supply in response to the determination that the malfunction has occurred while the second control circuit controls the power supply to output a constant current.

2. The power supply according to claim 1, wherein the switching circuit is configured to switch the control of the power supply from the first control circuit to the second control circuit when the output current of the power supply is equal to or greater than a threshold.

3. The power supply according to claim 1, wherein the power supply control circuit is configured to output the status information in response to the determination that the malfunction has occurred in the power supply and based on an operating state to convert an alternating current voltage of a commercial power source into a direct current voltage and output the direct current voltage to the switching circuit while the second control circuit controls the power supply to output the constant current.

4. An image forming apparatus comprising the power supply according to claim 1.

5. The image forming apparatus according to claim 4, further comprising a display, wherein the power supply control circuit causes the display to display the status information.

6. A power supply method comprising:
 controlling an output voltage of a power supply by a first control unit;
 controlling an output current of the power supply by a second control unit;
 switching control of the power supply from the first control unit to the second control unit based on the output current of the power supply while the first control unit controls the output voltage of the power supply;
 determining that a malfunction has occurred in the power supply upon detecting that the output voltage of the power supply is equal to or lower than a threshold; and
 outputting status information indicating the malfunction of the power supply in response to the determination that the malfunction has occurred in the power supply while the second control unit controls the power supply to output a constant current.

7. The power supply method according to claim 6, further comprising switching the control of the power supply from the first control unit to the second control unit when the output current of the power supply is equal to or greater than a threshold.

8. The power supply method according to claim 6, further comprising outputting the status information in response to the determination that the malfunction has occurred in the power supply and based on an operating state to convert an alternating current voltage of a commercial power source into a direct current voltage and output the direct current voltage while the second control unit controls the power supply to output the constant current.

9. A power supply comprising:
first control means for controlling an output voltage of the power supply;
second control means for controlling an output current of the power supply;
switching means for switching control of the power supply from the first control means to the second control means based on the output current of the power supply while the first control means controls the output voltage of the power supply;
determination means for determining that a malfunction has occurred in the power supply upon detecting that the output voltage of the power supply is equal to or lower than a threshold; and
information indicating means for outputting status information indicating the malfunction of the power supply in response to the determination that the malfunction has occurred in the power supply while the second control means controls the power supply to output a constant current.

10. The power supply according to claim 9, wherein the switching means is for switching the control of the power supply from the first control means to the second control means when the output current of the power supply is equal to or greater than a threshold.

11. The power supply according to claim 9, wherein the information indicating means is for outputting the status information in response to the determination that the malfunction has occurred in the power supply and based on an operating state to convert an alternating current voltage of a commercial power source into a direct current voltage and output the direct current voltage to the switching means while the second control means controls the power supply to output the constant current.

12. An image forming apparatus comprising the power supply according to claim 9.

13. The image forming apparatus according to claim 12, further comprising display means for displaying the status information,
wherein the information indicating means is for causing the display means to display the status information.

* * * * *